US008112615B1

(12) United States Patent
Beard

(10) Patent No.: US 8,112,615 B1
(45) Date of Patent: Feb. 7, 2012

(54) SINGLE CYCLE REDUCED COMPLEXITY CPU

(75) Inventor: Paul Beard, Milpitas, CA (US)

(73) Assignee: Cypress Semiconductor Corporation, San Jose ( * ) Notice: Subject to any disclaimer, the term of this patent is extended or adjusted under 35 U.S.C. 154(b) by 393 days.

(21) Appl. No.: 10/256,830

(22) Filed: Sep. 27, 2002

(51) Int. Cl.
*G06F 15/76* (2006.01)
(52) U.S. Cl. .......................................................... 712/41
(58) Field of Classification Search ...................... 712/41
See application file for complete search history.

(56) References Cited

U.S. PATENT DOCUMENTS

| | | | |
|---|---|---|---|
| 5,091,846 A * | 2/1992 | Sachs et al. .................... | 711/130 |
| 5,526,500 A * | 6/1996 | Tanksalvala et al. ......... | 712/218 |
| 6,822,959 B2 * | 11/2004 | Galbi et al. .................... | 370/392 |
| 7,010,677 B2 * | 3/2006 | Matsuo .......................... | 712/241 |
| 2001/0054060 A1 * | 12/2001 | Fillebrown et al. ........... | 709/201 |

OTHER PUBLICATIONS

Hennessy et al. "Computer Organization: the hardware/software interface." Morgan Kaufmann Publishers, Inc. 1998. pp. 351-368.*
Atmel Corporation. "Secure Microcontroller for Smart Cards: AT90SC6464C." Jul. 2001.*
Turley, Jim. "Atmel AVR Brings RISC to 8-Bit World: Better Performance Than Other 8-Bit Chips With Same Low Cost." Microprocessor Report, vol. 11, No. 9. Jul. 14, 1997.*
'Link control sequencer'—Google Search. Google website, www.google.com. 2005, p. 1.*
"Results (p. 1): link control sequencer". USPTO Portal, The ACM Digital Libray. 2005, p. 1.*
"IEEE Xplore Search Result." IEEE Xplore. 2005, p. 1.*
The Authoritative Dictionary of IEEE Standards Terms, 7$^{th}$ Edition. Standards Information Network IEEE Press, 2000.*
Kime, Charles R., Mano, Morris M. "Logic and Computer Design Fundamentals." pp. 429-437. Prentice Hall, 2000.*
Mano, Morris M., Kime, Charles R. "Logic and computer design fundamentals" Prentice Hall, 2$^{nd}$ edition, Sep. 17, 1999. pp. 191-205.*

* cited by examiner

*Primary Examiner* — Jacob A Petranek

(57) ABSTRACT

A single cycle RISC CPU. The single cycle RISC CPU includes an instruction decoder configured to perform an instruction fetch and an instruction decode. An arithmetic logic unit is coupled to the instruction decoder. The arithmetic logic unit is configured to perform an instruction execute and produce a resulting data output. A register file is coupled to the arithmetic logic unit. The register file includes a register input and a register output. The register file is configured to provide data for the instruction fetch via the register output and accept the resulting data output via the register input such that the instruction fetch, the instruction decode, and the instruction execute are performed in a single clock cycle.

18 Claims, 4 Drawing Sheets

SINGLE CYCLE REDUCED COMPLEXITY CPU

FIELD OF THE INVENTION

The field of the present invention pertains to digital electronic computer systems. More particularly, the present invention relates to an architecture for a central processor unit configured to execute instructions within a single clock cycle.

BACKGROUND OF THE INVENTION

Digital computers are being used today to perform a wide variety of tasks. Many different areas of business, industry, government, education, entertainment, and most recently, the home, are tapping into the enormous and rapidly growing list of applications developed for today's increasingly powerful computer devices. Computers and other types of "smart" devices have also become a key technology for communicating ideas, data, and trends between and among business professionals. Additionally, digital computers, or more particularly, digital central processor units (CPUs) are increasingly being embedded in a variety of devices that are not traditionally associated with information technology. Examples include microcontrollers for machine tools, mechanisms, engines, and the like. The power and flexibility of the CPUs makes them well-suited for incorporation into a large number of different types of devices.

As embedded computer systems become increasingly ubiquitous and widespread in their use, there is increasing interest in improving the performance and software execution speed of the computer systems. One of the methods used by designers to increase software execution speed is to increase the processor "clock speed." Clock speed refers to the rate at which the CPU steps its way through the individual software instructions. Increasing the number of clock cycles per second directly increases the number of instructions executed per second.

Another method used by designers is to increase the density of the electrical components within integrated circuit dies. For example, many high-performance integrated circuit processors include tens of millions of transistors integrated into a single die (e.g., 60 million transistors or more). As density increases, the clock speeds possible within a given design also increase, for example, as circuit traces are packed ever more closely together.

Another method for increasing performance is to increase the efficiency of heat removal from a high-density high-performance integrated circuit. As component density increases and clock speed increases, the thermal energy that must be dissipated per unit area of silicon also increases. To maintain high performance, stable operating temperature must maintained. Accordingly, the use of carefully designed heat dissipation devices (e.g., heat sink fans, liquid cooling, heat spreaders, etc.) with high-performance processors has become relatively standardized.

There are limits to the extent to which each of the above methods of improving computer system performance can be reasonably implemented. For example, with respect to increasing clock speed, high clock speeds leads to excessively tight tolerances for wiring, chipsets, printed circuit board design, and the like in order to ensure reliable operation. Additionally, high clock speeds tend to increase power consumption of the CPU. With respect to increasing the density of the electrical components within the integrated circuit die, as more and more transistors and other circuit elements are able to be incorporated within an integrated circuit die, there is increasing pressure to incorporate other functions within the die which used to be separate discrete chips. Often, greater performance can be realized by incorporating additional amounts of memory, controller hardware, and the like, as opposed to incorporating circuit elements designed to purely increase the speed of the CPU. Accordingly, silicon area tends to be just as valuable with a high-density fabrication process as with a less advanced lower density fabrication process. With respect to heat removal, the use of carefully designed heat dissipation devices limits the packaging options available to a device designer. This is especially cumbersome in the case of embedded computer devices. As described above, high clock speeds tend to directly cause high heat dissipation requirements, thus, requiring expensive and more space consuming heat dissipation devices in order to ensure high-performance.

Because of these limitations, CPU designers also concentrate on designing the circuitry of the CPU such that instructions can execute as efficiently as possible. For example, with many microprocessor designs, one or more instructions are capable of being executed per clock cycle. RISC (reduced instruction set computing) CPUs are specifically designed to have instruction sets wherein the majority of the instructions are capable of being executed within a single clock cycle. Additionally, RISC CPUs are designed to be simple in comparison to more complex CPUs, such that they require less silicon area in their manufacture. Because of these advantages, many microcontroller type devices are often based on RISC type CPUs.

These processors are RISC based, but still require separate instruction fetch, decode, execute and write-back stages in order to implement many types of commonly used instructions. A separate clock cycle is required for each of these stages. Thus, for example, read-modify-write type instructions require a minimum of four clock cycles to complete. In order to perform instructions faster than four clock cycles each, complex pipelining and microcode are required. This leads to a very complex processor design which consumes a large amount of silicon area to implement on chip. Although pipelining improves instruction throughput, the instruction latency is still four clock cycles. The complex pipelining also imposes additional penalties with respect to instruction branching. In the event of a branch, all the instructions in the pipeline need to be flushed and the pipeline needs to be refilled with new instructions, thereby imposing a significant performance penalty.

Thus, a need exists for a RISC type processor solution that can execute many different types of instructions within a single clock cycle. A need exists for a solution that increases processor performance without relying solely upon increased clock speed, component density, or heat dissipation.

SUMMARY OF THE INVENTION

Embodiments of the present invention provide a RISC type processor that can execute many different types of instructions within a single clock cycle. Embodiments of the present invention increase processor performance by executing many different types of instructions within a single clock cycle and eliminating any latency penalties associated with pipelined bus architectures.

In one system embodiment, the present invention is implemented as a single cycle RISC CPU. In this embodiment, the single cycle RISC CPU includes an instruction decoder configured to perform an instruction fetch and an instruction decode. An arithmetic logic unit is coupled to the instruction decoder. The arithmetic logic unit is configured to perform an instruction execute and produce a resulting data output. A register file is coupled to the arithmetic logic unit. The register file includes a register input and a register output. The register file is configured to provide data for the instruction fetch via the register output and accept the resulting data output via the register input such that the instruction fetch, the instruction decode, and the instruction execute are performed in a single clock cycle.

In another embodiment, the single cycle RISC CPU has an internal configuration wherein the instruction decoder, the arithmetic logic unit, and the register file are coupled using a non-pipelined bus architecture. The non-pipelined bus architecture is configured to implement an instruction branch without incurring a latency penalty. Additionally, the RISC CPU can be configured to implement a link control sequencer for a communication system.

In another embodiment, the single cycle RISC CPU has a configuration that is in accordance with a Harvard architecture design. Additionally, the instruction decoder can be configured to function with instructions compatible with well known microcontroller instruction set standards.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a single cycle RISC type processor that can execute many different types of instructions within a single clock cycle. Embodiments of the present invention increase processor performance by executing many different types of instructions within a single clock cycle and eliminating any latency penalties associated with pipelined bus architectures. Embodiments of the present invention and their benefits are further described below.

Figure 1:
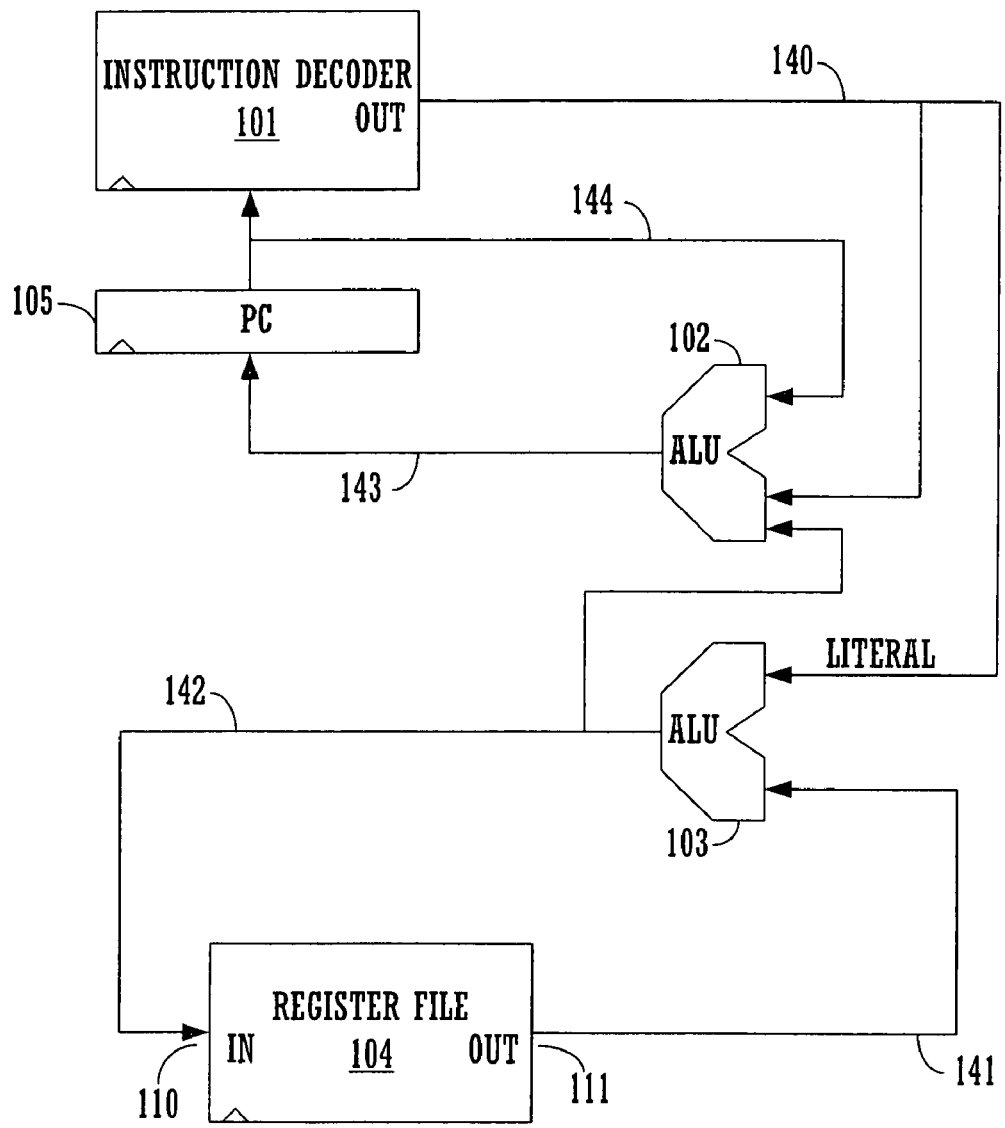
FIG. 1 shows a block diagram of a single cycle RISC type processor in accordance with one embodiment of the present invention.

FIG. 1 shows a block diagram of a single cycle RISC type processor 100 in accordance with one embodiment of the present invention. As depicted in FIG. 1, processor 100 includes an instruction decoder 101 coupled to a first and second ALU (arithmetic logic unit) 102-103. The first and second ALUs 102-103 are also coupled to a register file 104.

In the system 100 embodiment, the components 101-105 are configured to implement a single cycle RISC CPU. In the present embodiment, the single cycle RISC CPU 100 includes the instruction decoder 101 configured to perform an instruction fetch and an instruction decode. Although the instruction decoder 101 is depicted as a single component, it should be noted that the instruction decoder 101 can be implemented as a separate instruction storage unit (e.g., instruction register) coupled to a separate instruction decoder. A pointer compute unit 105 is shown coupled to the instruction decoder 101 (e.g., for incrementing, decrementing, and otherwise tracking the instruction pointer). The arithmetic logic units 102-103 are coupled to the instruction decoder 101 as shown. The arithmetic logic units 102-103 are configured to perform an instruction execute (e.g., integer addition, address computation, etc.) and produce a resulting data output. In this embodiment, the data output of the ALU 103 is coupled to an input of the ALU 102.

The register file 104 is coupled to the arithmetic logic units 102-103. The register file 104 includes a register input 110 and a register output 111. The register file 104 is configured to provide data (e.g., instruction pointer, etc.) for the instruction fetch (e.g., for the instruction decoder 101) via the register output 111 and accept the resulting data output via the register input 110 such that the instruction fetch, the instruction decode, and the instruction execute are performed in a single clock cycle.

Referring still to processor 100 of FIG. 1, the output of the instruction decoder 101 is coupled to the ALUs 102-103 as shown. These instructions enable the ALUs 102-103 to perform the instruction execute as commanded. The result of the instruction execute is provided to the input 110 of the register file 104 as shown. The output 111 of the register file 104 is provided to an input of the ALU 103, which in turn, can provide the output 111 to the ALU 102, the pointer compute 105, and the instruction decoder 101.

The processor 100 embodiment of the present invention utilizes a property of the register file 104 in that there will exist a brief period of time wherein data present on the input 110 will not change data present at the output 111 of the register file 104. In other words, there is a discrete amount of time required for a change of the data at the input 110 to be reflected at the output 111. During this discrete amount of time, processor 100 can read data at the output 111 (e.g., instruction fetch), decode this data (e.g., instruction decode), perform an instruction execute (e.g., using the ALUs 102-103), and provide the resulting data back to the input 110 so that it can be clocked into the register file 104 at the next rising edge.

In so doing, a complete instruction is executed within a single clock cycle. Particularly, a read-modify-write instruction is implemented within a single clock cycle, wherein data is read from a register, that data is modified through an instruction execution, and that data is written back to the register all within a single clock cycle. As known by those skilled in the art, such a read-modify-write instruction is impossible to implement within a single clock cycle using prior art RISC type CPUs.

In the present embodiment, the processor 100 has an internal configuration wherein the instruction decoder 101, the ALUs 102-103, and the register file 104 are coupled using a non-pipelined bus architecture comprising buses 140-144. Because the nature in which single cycle instructions are executed, the processor 100 embodiment of the present invention does not require a pipelined bus architecture in order to ensure a high degree of instruction throughput. The non-pipelined bus architecture is thus configured to implement an instruction branch without incurring a latency penalty. As known by those skilled in the art, prior art type deeply pipelined RISC processors incur a very significant performance penalty on instruction branches, wherein the deep pipelines need to be flushed and completely refilled.

In the present embodiment, the processor 100 has a configuration that is in accordance with a Harvard architecture design (e.g., separate buses and storage systems for instructions and data).

The processor 100 embodiment is flexible in that the instruction decoder 101 can be configured to function with instructions compatible with well known microcontroller instruction set standards. This provides advantages in enabling a designer to use well known and widely used tools to develop software for the processor 100.

Because of the speed of execution (e.g., 1 instruction executed per clock cycle) the processor 100 embodiment is well-suited for highly demanding applications which require high-performance and limited silicon area. For example, embodiments of the processor 100 architecture can be configured to implement a link control sequencer (LCS) for a communication system. In such embodiment, the link control sequencer would be used to perform CRC (cyclic redundancy checking) processing, packet computations and packet movement, and the like. Example applications include wireless transmission systems such as Bluetooth, and the like.

Figure 2:
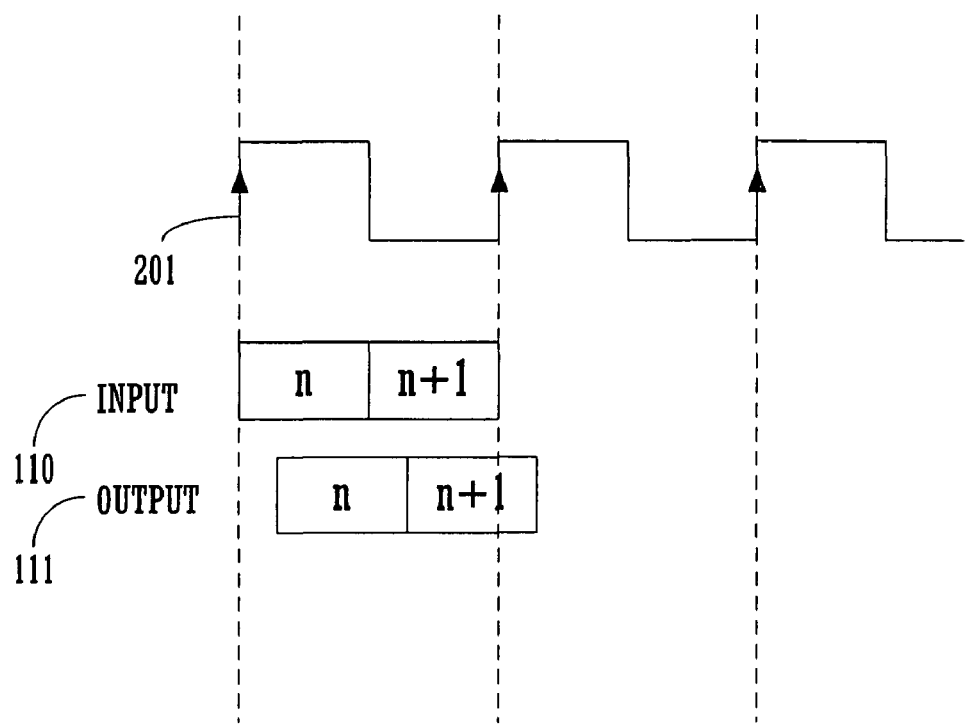
FIG. 2 shows a timing diagram of a single cycle RISC type processor in accordance with one embodiment of the present invention.

FIG. 2 shows a timing diagram 200 in accordance with one embodiment of the present invention. As depicted in FIG. 2, the timing diagram 200 shows the relationship between the input 110 of the register file 104 and the output 111 with respect to a clock signal 201.

The components 101-105 of the processor 100 embodiment are latched on the rising edge of the clock signal 201. Thus, the value on the input 110 is latched within the register file 104 synchronous to the rising edge of the clock signal 201, as shown by the values "n" and "n+1." As described above, there is a discrete amount of time required for the same values to be reflected at the output 110 of the register file 104. This is shown as the slight offset delay for the values "n" and "n+1" on the output 111 with respect to the rising edge of the clock signal 201. Hence, as described above, during this discrete amount of time, processor 100 can read data at the output 111 (e.g., instruction fetch), decode this data (e.g., instruction decode), perform an instruction execute (e.g., using the ALUs 102-103), and provide the resulting data back to the input 110.

Figure 3:
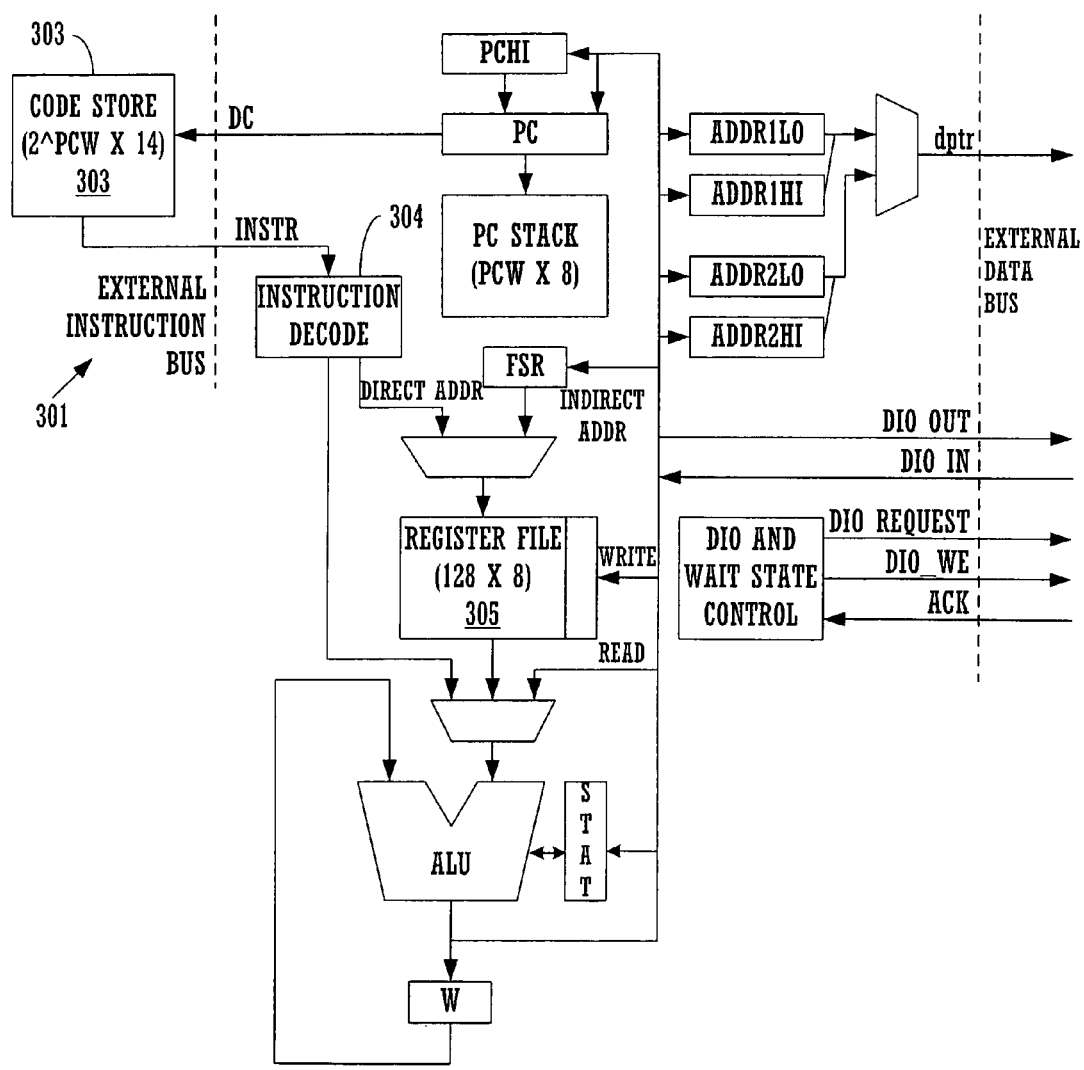
FIG. 3 shows a more detailed implementation of a single cycle RISC processor in accordance with one embodiment of the present invention.

FIG. 3 shows a more detailed implementation of a single cycle RISC processor 300 in accordance with one embodiment of the present invention. The processor 300 functions in a manner substantially the same as processor 100 FIG. 1. The processor 300 embodiment explicitly shows additional features with respect to separate external address and data buses 301-302. The processor 300 embodiment also explicitly shows a separate instruction code storage unit 303 coupled to a separate instruction decoder 304. The processor 300 embodiment also explicitly shows the register file 305 as a 128×8 bit register file. As with processor 100 of FIG. 1, processor 300 can be implemented in a manner compatible with the well known microcontroller instruction set standards. Additionally, as with processor 100 of FIG. 1, processor 300 can perform a complete instruction execution within a single clock cycle.

Figure 4:
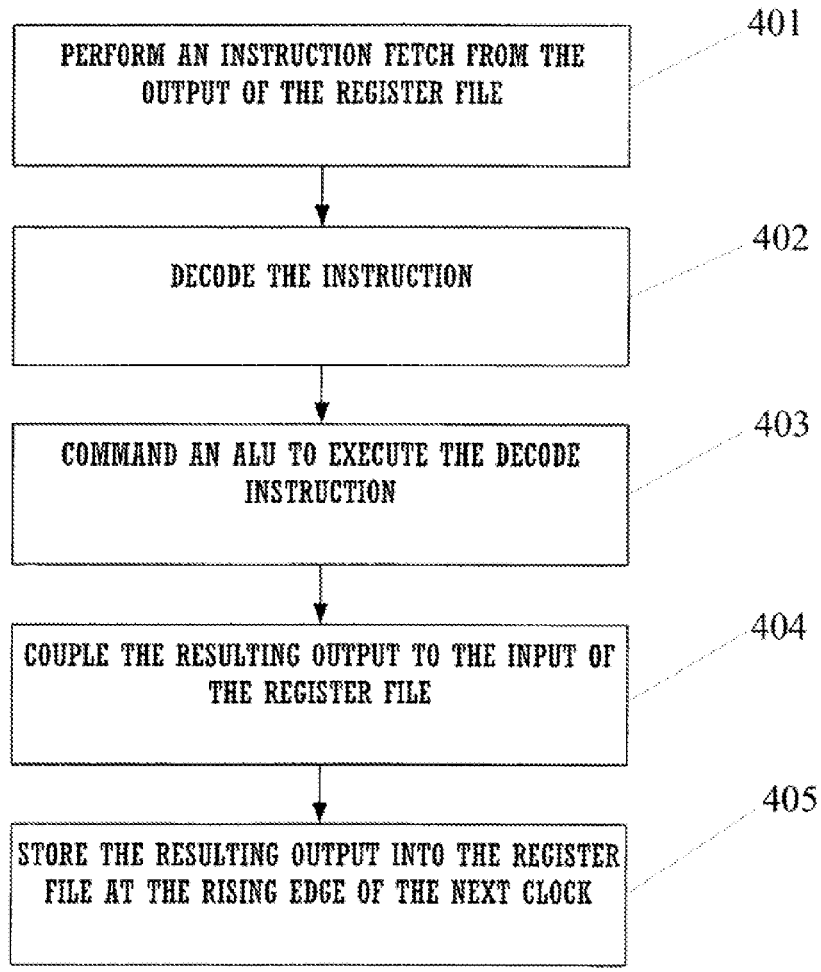
FIG. 4 shows a flowchart of the steps of an operating process in accordance with one embodiment of the present invention.

FIG. 4 shows a flowchart of the steps of a process 400 in accordance with one embodiment of the present invention. As depicted in FIG. 4, process 400 shows the operating steps of a single cycle RISC processor (e.g., processor 100 FIG. 1) as the processor executes a read-modify-write instruction within a single clock cycle.

Process 400 begins in step 401, where an instruction decoder (e.g., instruction decoder 101) of a processor performs an instruction fetch from the output (e.g., output 111) of a register file (e.g., register file 104). In step 402, the instruction decoder decodes the fetched instruction. In step 403, the instruction decoder commands the ALU (e.g., ALUs 102-103) to execute the decoded instruction (e.g., perform an addition, address computation, branch evaluation, etc.). In step 404, the resulting output of the instruction execution is coupled to the input of the register file. Subsequently, in step 405, the resulting output is latched into the register file at the rising edge of the next clock. In this manner, process 400 executes a read-modify-write instruction within a single clock cycle.

Thus, embodiments of the present invention provide a RISC type processor that can execute many different types of instructions within a single clock cycle. Embodiments of the present invention increase processor performance by executing many different types of instructions within a single clock cycle and eliminating the latency penalties associated with pipelined bus architectures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A single cycle RISC processor to perform instruction execution operations, the processor comprising:
   a register file having a register input and a register output, the register file configured such that a signal provided to the register input is reflected at the register output after an offset delay, and configured to provide data for an instruction fetch via the register output;
   an instruction decoder configured to perform an instruction decode;
   an arithmetic logic unit coupled to the register file and to the instruction decoder, the arithmetic logic unit configured to perform an instruction execution operation based on data from the register output and to provide a resulting data output to the register input; and
   the RISC processor configured to perform instruction execution operation in which the instruction fetch, the instruction decode, and the instruction execution on data fetched from the register output are completed during a time period that is less than a duration of the offset delay in a clock cycle for the instruction execution operation, wherein the duration of the offset delay is less than a duration of the clock cycle.

2. The single cycle RISC processor of claim 1, configured to implement an instruction branch without incurring a latency penalty.

3. The single cycle RISC processor of claim 1, wherein the instruction decoder, the arithmetic logic unit, and the register file implement a Harvard architecture design.

4. The single cycle RISC processor of claim 1, wherein the instruction decoder, the arithmetic logic unit, and the register file implement a link control sequencer.

5. The single cycle RISC processor of claim 1, wherein the instruction decoder is configured to function with instructions compatible with a microcontroller instruction set standard.

6. The single cycle RISC processor of claim 1 further comprising:
an external data bus and an external instruction bus.

7. The single cycle RISC processor of claim 1, wherein the resulting data to the register input are latched into the register file on an edge of a clock pulse of a next clock cycle.

8. A single cycle RISC processor comprising:
an instruction decoder configured to perform an instruction decodes;
an external instruction bus configured to couple said instruction decoder to an external instruction memory located outside said single cycle RISC processor;
an arithmetic logic unit coupled to the instruction decoder, the arithmetic logic unit configured to perform an instruction execution operation to generate a resulting data output;
a register file coupled to the arithmetic logic unit, the register file having a register input and a register output, the register file configured to provide data for an instruction fetch via the register output and to receive the resulting data output via the register input such that the instruction fetch using said external instruction bus, the instruction decode, and the instruction execution on data from the register output in a current instruction execution operation are completed in a single clock cycle during an offset delay defined by the time required during for a change of data at the register input to be reflected at the register output, wherein a duration of the offset delay is less than a duration of a single clock cycle for the instruction execution operation.

9. The single cycle RISC processor of claim 8, configured to implement an instruction branch without incurring a latency penalty.

10. The single cycle RISC processor of claim 8, wherein the instruction decoder, the arithmetic logic unit, and the register file implement a Harvard architecture design, and wherein said single cycle RISC processor further comprises:
an external data bus separate from said external instruction bus.

11. The single cycle RISC processor of claim 8, wherein the instruction decoder is configured to function with instructions compatible with a microcontroller instruction set standard.

12. The single cycle RISC processor of claim 8, comprising a separate data bus.

13. The single cycle RISC processor of claim 8, wherein the resulting data to the register input are latched into the register file on an edge of a clock pulse of a next clock cycle.

14. A method of performing single cycle instruction execution operations, said method comprising:
performing an instruction fetch of at least one instruction and decoding said at least one instruction using an instruction decoder;
executing said at least one instruction to generate a resulting data output using an arithmetic logic unit coupled to the instruction decoder;
transmitting data for the instruction fetch via a register output of a register file coupled to the arithmetic logic unit; and
providing the resulting data output to a register input of the register file such that the instruction fetch, the decoding, and the executing are performed in a single clock cycle during an offset delay defined by the time required for a change of data at the register input to be reflected at the register output, wherein a duration of the offset delay is less than a duration of the single clock cycle; and clocking said resulting data output into the register file contemporaneously with a clock pulse edge of a subsequent clock cycle.

15. The method of claim 14, wherein the instruction decoder, the arithmetic logic unit, and the register file are coupled using a non-pipelined bus architecture configured to implement an instruction branch without incurring a latency penalty.

16. The method of claim 14, wherein said instruction fetch, said decoding, and said executing are performed in accordance with a Harvard architecture design.

17. The method of claim 14, wherein said instruction fetch, said decoding, and said executing implement a link control sequencer.

18. The method of claim 14, wherein the resulting data to the register input are latched into the register file on a rising edge of a clock pulse of a next clock cycle.

* * * * *